US005339020A

United States Patent [19]

Siligoni, deceased et al.

[11] Patent Number: 5,339,020

[45] Date of Patent: Aug. 16, 1994

[54] VOLTAGE REGULATING INTEGRATED CIRCUIT

[75] Inventors: Marco Siligoni, deceased, late of Vittuone, Italy, by Ivana Marcioni, legal representative; Aldo Torazzina, Monza, Italy

[73] Assignee: SGS-Thomson Microelectronics, S.r.l., Agate Brianza, Israel

[21] Appl. No.: 916,517

[22] Filed: Jul. 20, 1992

[30] Foreign Application Priority Data

Jul. 18, 1991 [IT] Italy ........................ MI91 A 001994

[51] Int. Cl.[5] ................................................ G06F 3/16

[52] U.S. Cl. .................................... 323/313; 323/315; 323/281

[58] Field of Search ............... 323/313, 312, 315, 316, 323/907, 901, 281; 307/296.6, 296.7, 296.8, 296.1, 296.2

[56] References Cited

U.S. PATENT DOCUMENTS

| | | | |
|---|---|---|---|
| 3,922,596 | 11/1975 | Cave et al. | 307/296 |
| 3,979,663 | 9/1976 | Herchner | 323/4 |
| 4,055,774 | 10/1977 | Ahmed | 307/296 R |
| 4,059,793 | 11/1977 | Ahmed | 328/19 |
| 4,251,743 | 2/1981 | Hareyama | 307/297 |
| 4,339,707 | 7/1982 | Gorecki | 323/313 |
| 4,628,248 | 12/1986 | Birrittella et al. | 323/314 |
| 4,651,083 | 3/1987 | Lachmann et al. | 323/316 |
| 4,714,872 | 12/1987 | Traa | 323/314 |
| 4,785,231 | 11/1988 | Böhme et al. | 323/316 |
| 4,792,748 | 12/1988 | Thomas et al. | 323/312 |
| 4,800,589 | 1/1989 | Siligoni et al. | 379/413 |
| 4,885,525 | 12/1989 | Gontowski, Jr. | 323/315 |
| 4,897,872 | 1/1990 | Siligoni et al. | 379/412 |
| 5,046,089 | 2/1991 | Pariani et al. | 379/399 |
| 5,081,410 | 1/1992 | Wood et al. | 323/316 |
| 5,084,665 | 1/1992 | Dixon et al. | 323/281 |
| 5,087,830 | 2/1992 | Cave et al. | 307/296.6 |
| 5,103,159 | 4/1992 | Breugnot et al. | 323/315 |

FOREIGN PATENT DOCUMENTS

| | | |
|---|---|---|
| 58-012345 | 1/1983 | Japan . |
| 60-017519 | 1/1985 | Japan . |
| 60-093533 | 5/1988 | Japan . |

OTHER PUBLICATIONS

IBM Technical Disclosure Bulletin, vol. 22, No. 11, Apr. 1980, New York, p. 4977, H. Heimeier et al., 'Current Mirror and Image Tolerance Compensation'.

Patent Abstracts of Japan, vol. 7, No. 84 (E-169) Apr. 7, 1983.

IBM Technical Disclosure Bulletin, vol. 30, No. 10, Mar. 10, 1988, New York, pp. 27–29, 'Reference Generator Insensitive to Power Supply Variation'.

Patent Abstracts of Japan, vol. 9, No. 239 (P-391)(1962) Sep. 25, 1985.

Patent Abstracts of Japan, vol. 9, Nō. 137 (P-363)(1860) Jun. 12, 1985.

*Primary Examiner*—Steven L. Stephan
*Assistant Examiner*—Adolf Berhane
*Attorney, Agent, or Firm*—Robert Groover

[57] ABSTRACT

An integrated circuit bandgap voltage reference, in which the regulated voltage is equal to the sum of a first transistor's base-emitter voltage plus a voltage which is proportional to the difference between the base-emitter voltages of two transistors operating at different current densities, PLUS an additional voltage which is equal to the base-emitter drop of an additional transistor. The additional transistor is connected to an emitter resistor which ensures that variations in resistor values will cause the base-emitter drop of the additional transistor to vary oppositely to the base-emitter drop of the first transistor. The resulting voltage reference circuit has high stability and low power consumption.

37 Claims, 4 Drawing Sheets

VOLTAGE REGULATING INTEGRATED CIRCUIT

BACKGROUND AND SUMMARY OF THE INVENTION

The present invention relates to analog integrated circuits.

The invention concerns an integrated circuit adapted to supply other integrated circuits with a reference voltage (or reference current) which is stable in value. This is particularly advantageous with telecommunications circuits. The following description will make reference to this field of application, for convenience of illustration, but it should be understood that the claimed inventions are not necessarily limited to this field of use.

Integrated circuits for telecommunications applications (such as Subscriber Line Interface Circuits) are quite complex. (Discussion of Subscriber Line Interface Circuits may be found in U.S. Pat. Nos. 4,800,589 to Siligoni et al., 4,897,872 to Siligoni et al., and 5,046,089 to Pariani et al.; all of which are hereby incorporated by reference.) In order to perform correctly in accordance with their design specifications, many such integrated circuits need to be supplied a reference current $I_{ref}$ which is stable over time. (This reference current is critical, since several circuit parameters depend on it.) To provide this current, the telecommunications circuit is usually associated with an integrated circuit voltage regulator which outputs a stable reference voltage, from which the reference current is derived. The disclosed innovations provide an improved voltage regulator, and improved system, of this type.

Conventional voltage regulator circuits incorporate several resistors, and this fact unavoidably poses some difficulties in integrated circuit implementations. Normal integrated circuit fabrication processes produce wide unpredictable variations in resistor values, in the resistances of doped semiconductor regions, and in the characteristics of active devices. Typically the circuit designer must allow for tolerances of ±20% in the designed resistor values, and for even wider variations in transistor gain. (Laser trimming or other special process steps can be used to adjust the value of the as-fabricated resistors, but such steps are expensive.) Moreover, the resistances of doped semiconductor regions, and the gain of transistors, may vary strongly with temperature. (See generally S.Sze, PHYSICS OF SEMICONDUCTOR DEVICES (2.ed. 1981); A. Grove, PHYSICS AND TECHNOLOGY OF SEMICONDUCTOR DEVICES (1967); VLSI TECHNOLOGY (2.ed. Sze 1988); S.Sze, SEMICONDUCTOR DEVICES, PHYSICS AND TECHNOLOGY (1985); A. Glaser & G. Subak-Sharpe, INTEGRATED CIRCUIT ENGINEERING (1977); A. Milnes, SEMICONDUCTOR DEVICES AND INTEGRATED ELECTRONICS (1980); B. Streetman, SOLID STATE ELECTRONIC DEVICES (3rd ed. 1990); and R. Muller & T. Kamins, DEVICE ELECTRONICS FOR INTEGRATED CIRCUITS (1986); all of which are hereby incorporated by reference.)

Much work has been expended on developing circuits for providing a stable reference voltage. One particularly important family of circuits is those referred to "bandgap voltage reference" circuits. Such circuits generally use a structure wherein the difference between base-to-emitter voltage drops at two different emitter current densities appears across a resistor. Since this differential voltage exhibits variation opposite to that of other components (e.g. a forward-biased junction diode), it provides a tool which can be used to achieve a regulated voltage which is reasonably independent of temperature and supply voltage.

A variety of circuits have been proposed for voltage reference circuits. A pioneering publication was Widlar, "New Developments in IC Voltage Regulators," 6 IEEE JOURNAL OF SOLID-STATE CIRCUITS 2ff (1971), which is hereby incorporated by reference. Other important developments are described in Brokaw, "A Simple Three-Terminal IC Bandgap Reference," 9 IEEE JOURNAL OF SOLID-STATE CIRCUITS 388ff (1974), which is hereby incorporated by reference. Expository discussions of this area of design may be found in P. Gray & R. Meyer, ANALYSIS AND DESIGN OF ANALOG INTEGRATED CIRCUITS (2.ed. 1984) (which is hereby incorporated by reference in its entirety), especially at pages 275–296 thereof; in D. Feucht, HANDBOOK OF ANALOG CIRCUIT DESIGN (1990) (which is hereby incorporated by reference in its entirety), especially at pages 522–547 thereof; and in J. Scott, ANALOG ELECTRONIC DESIGN (1991) (which is hereby incorporated by reference in its entirety), especially at pages 69–88 thereof. Other background on voltage and current reference circuits includes the following items, all of which are hereby incorporated by reference: U.S. Pat. Nos. 5,125,112, 5,119,015, 5,103,159, 5,087,830, 5,084,665, 5,081,410, 4,785,231, 4,714,872, 4,651,083, 4,647,841, 4,628,248, 4,596,948, 4,528,495, 4,498,041, 4,412,347, 4,361,797, 4,308,496, 4,297,646, 4,251,743, 4,059,793, 4,055,774, and 3,922,596; 1989 ISSCC DIGEST OF TECHNICAL PAPERS at 120–121; EDN vol. 33, no. 2, pp. 147–54; IEEE JOURNAL OF SOLID-STATE CIRCUITS vol. SC-22, at pp. 71ff (February 1987); Hart et al., "The Design of Constant Current Sources," ELECTRONIC ENGINEERING pp. 85–88, vol. 49, No. 593, (June 1977); and Caveliere et al., "Integrated transistor voltage/temperature regulator," IBM TECHNICAL DISCLOSURE BULLETIN vol. 25, no. 9 p. 4863 (February 1983).

However, as will be discussed in detail below, the existing circuits still exhibit large power consumption, and/or second-order sensitivity to variations in as-fabricated resistor values, which are undesirable for integrated circuits.

INNOVATIVE CIRCUIT AND DEVICE

The disclosed innovative circuit provides high stability and low power consumption, and produces a predetermined stable voltage value on an output without requiring use of close-tolerance internal resistances.

The underlying technical problem of this invention is to provide a voltage regulating integrated circuit which has such structural and functional features as to produce a reference voltage which is stable over time and substantially unaffected by set tolerances for the internal resistances, and also ensure a low total current draw.

One important idea of the present invention is to compensate for the variation in the base-to-emitter voltage drop of a given transistor, which depends on the internal resistance tolerances, through an equal and opposite variation in the voltage drop of another transistor which is biased with a current dependent, in turn, on the value of such resistances.

The features and advantages of an integrated circuit according to the invention will become apparent from the following detailed description of an embodiment thereof, given by way of example and not of limitation with reference to the accompanying drawing.

BRIEF DESCRIPTION OF THE DRAWING

The present invention will be described with reference to the accompanying drawings, which show important sample embodiments of the invention and which are incorporated in the specification hereof by reference, wherein.

DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1A:
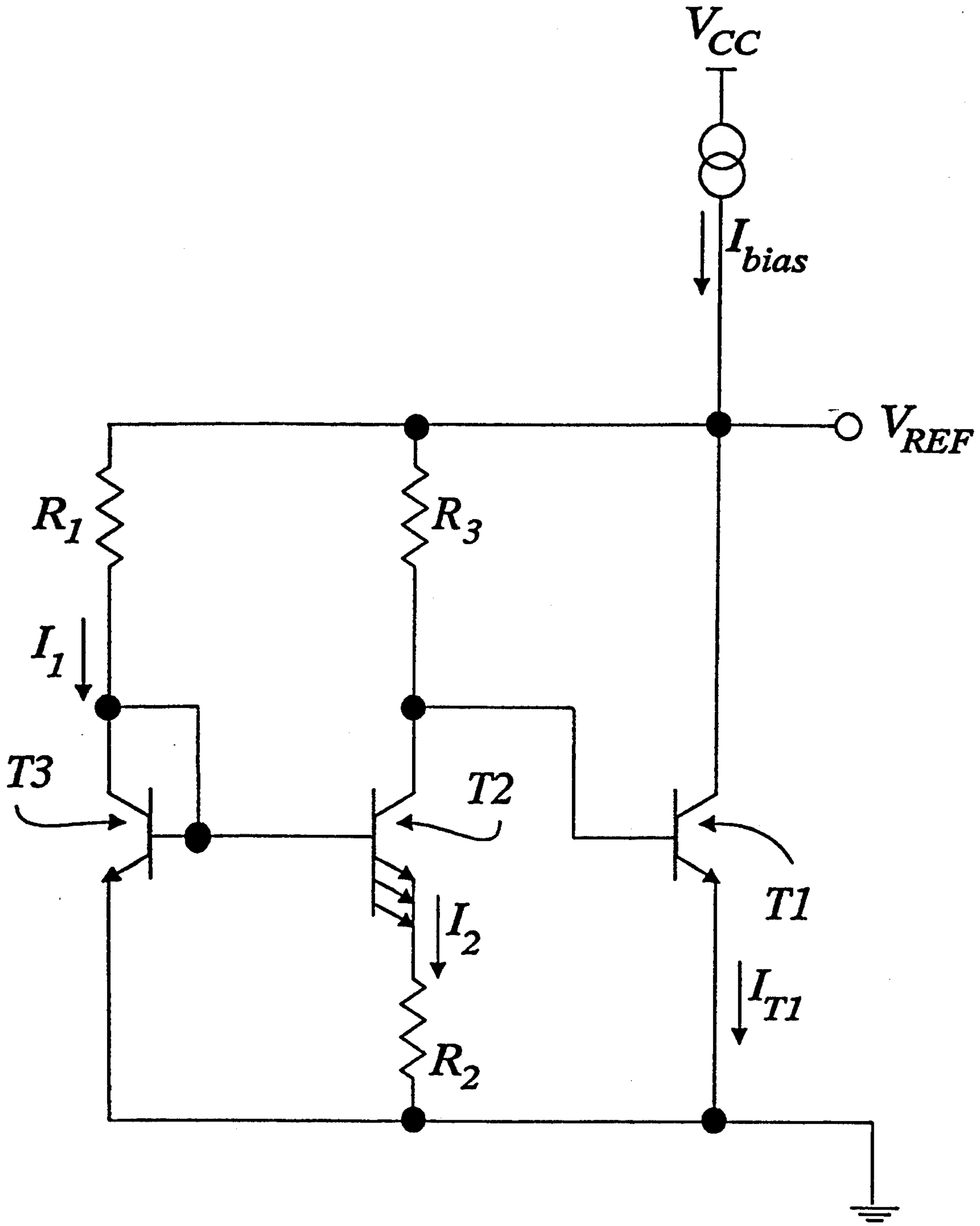
Fig. 1A PRIOR ART
FIG. 1A schematically shows a simple conventional circuit.

FIG. 1A schematically shows a simple version of a Widlar bandgap-referenced voltage reference circuit. Transistor T2 has a lower emitter current density (larger active area) than transistor T3, so that (due to the Early effect) the base-emitter drops of the two transistors are not equal. The resulting differential voltage appears across resistor $R_2$. This voltage has a temperature coefficient which is opposite to that of the diode drop. By appropriate selection of the resistor values, the voltage $V_{REF}$ at the collector of transistor T1 can be made to have zero variation with temperature (and good independence from the bias current $I_{bias}$). Note that this circuit configuration has the general shape of a shunt regulator, with transistor T1 pulling down $V_{REF}$ to a stable level of about 1.2 V.

Figure 1B:
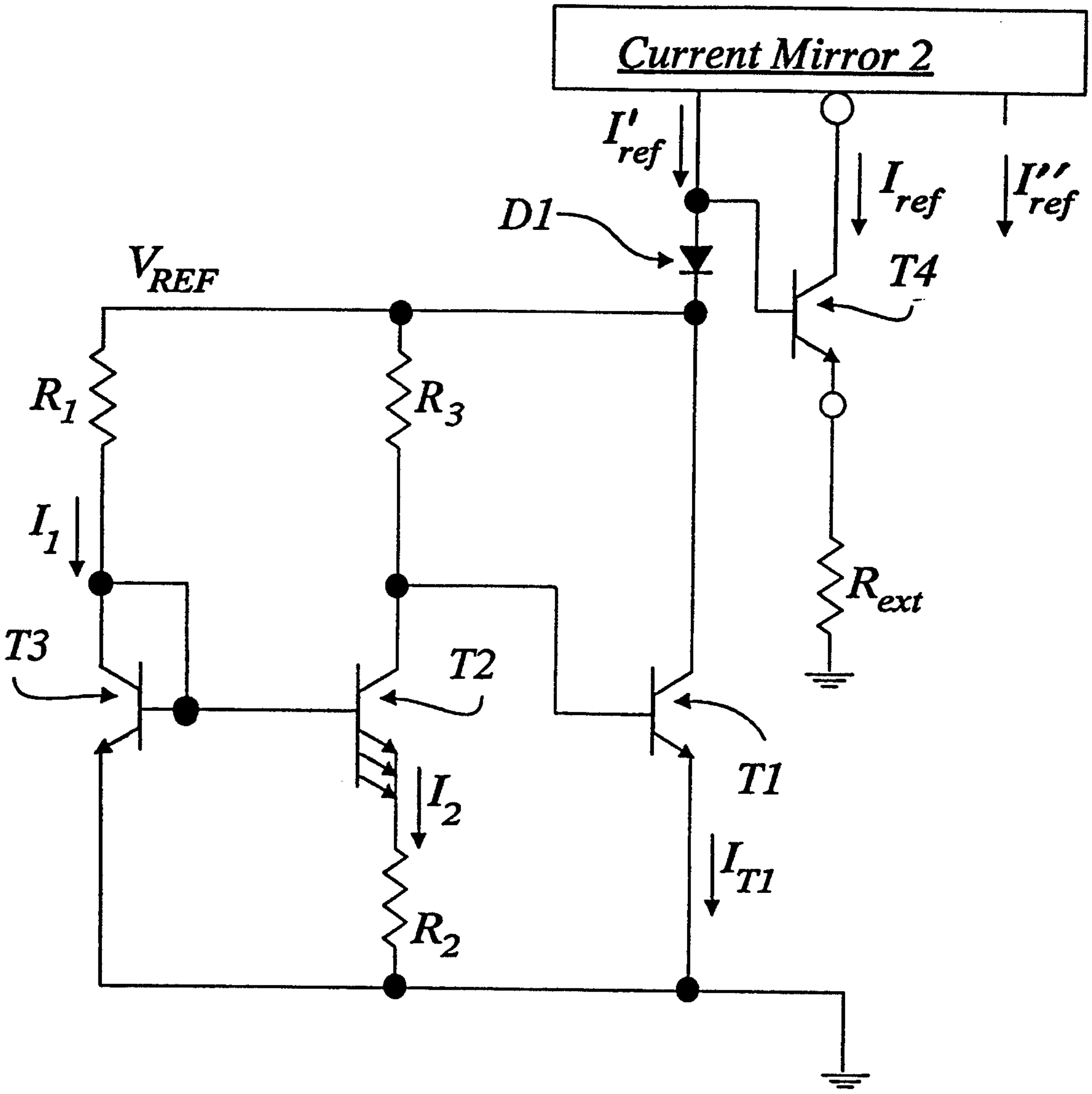
Fig. 1B PRIOR ART
FIG. 1B schematically shows a sample implementation of the circuit of FIG. 1A.

FIG. 1B schematically shows a more fully realized version of the circuit of FIG. 1A. In this example circuit, transistor T2 has about 10 times the active area of transistor T3, resistors $R_1$ and $R_3$ each have a value of about 12KΩ, and resistor $R_2$ has a value of about 1.2KΩ. The voltage at the emitter of transistor T4 will be equal to $$V_{E4} = V_{REF} + V_{D1} - V_{BE4} \approx V_{REF}.$$

Thus the current $I_{ref}$ drawn by external precision resistor $R_{ext}$ will be approximately equal to $$I_{ref} = \frac{V_{REF} + V_{D1} - V_{BE4}}{R_{ext}} \approx \frac{V_{REF}}{R_{ext}}.$$

Note that current mirror 2 is driven by $I_{ref}$ as an input, and produces not only one or more external corresponding current source outputs $I_{ref}'$, but also a corresponding current source output $I_{ref}$ which is fed back to provide the bias current for the reference-voltage-generating circuit. (Of course, as is well known in the art of analog design, the output currents are not necessarily strictly equal to the input currents; the current mirror also can be designed to make its output currents each equal to a multiple of the input current.)

This circuit has some problems. In the nature of this circuit, $V_{REF}$ will stay constant at about 1.2 Volts while the resistors change value (due to temperature dependence or normal process variation). However, consider the effect of resistance variation on the currents: $I_1$ and $I_2$ are both dependent on the resistor values:

$$I_1 = \frac{V_{REF} - V_{BE3}}{R_1};$$

$$I_2 = \frac{V_{BE3} - V_{BE2}}{R_2}.$$

Summing the currents through diode D1, it may be seen that $I_{T1}$ is related to $I_{ref}$ and $I_1$ and $I_2$ as follows:

$$I_{T1} = I_{ref} - I_1 - I_2 - I_{BE4} \approx I_{ref} - I_1 - I_2.$$

Since $V_{REF}$ and $R_{ext}$ are both quite constant, $I_{ref}$, which is equal to their ratio, will also be constant. (The base current term $I_{BE4}$ is close to zero. In general, the following analysis consistently disregards base currents, since the gain of analog bipolar transistors will typically be large, with $\beta$ values of 100 or more.) Thus, it may be seen that $I_{T1}$ will change with variation in the resistor values.

Variation in $I_{T1}$ will change the base-emitter drop of T1, in accordance with the familiar logarithmic dependence on emitter current density. Variation in $V_{BE1}$ will affect $V_{REF}$, due to the following relationship:

$$V_{ref} = V_{BE1} + (V_{BE3} - V_{BE2})\frac{R_3}{R_2},$$

One approach to these problems would be to increase the value of current $I_{T1}$, to minimize the effect of variations in $I_1$ and $I_2$. However, this approach encounters two further problems:

1) the total current (and hence the power consumption) is increased;
2) the base current of T1 ($I_{T1}/h_{FE}$) across resistor $R_3$ will vary with the process tolerance on $h_{FE}$. (Typically the maximum permissible value of $h_{FE}$ may be 3 times the minimum permissible value.) As $I_{T1}$ is increased, this becomes more significant.

Figure 2:
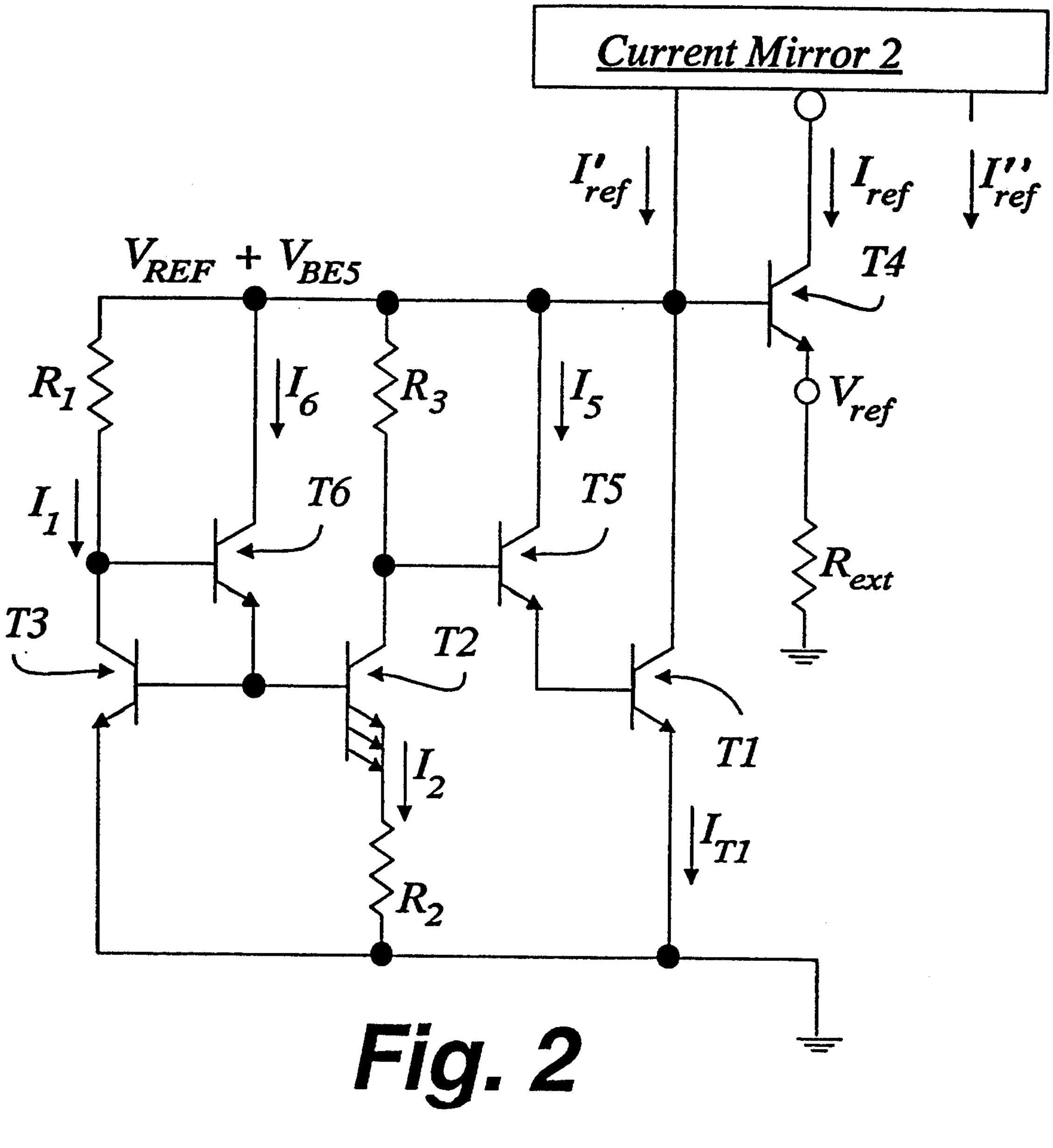
Fig. 2 PRIOR ART
FIG. 2 schematically shows an improvement on the circuit of FIG. 1B.

The second of these problems can be avoided with an arrangement like that shown in FIG. 2. In this circuit, only $1/h_{FE-T5}$ of the base current of transistor T1 appears on resistor $R_3$ (where $h_{FE-T5}$ is the $h_{FE}$ of transistor T5). However, this arrangement does not solve the problem of total power consumption.

Thus, variation in resistor values can indirectly produce variation in the $V_{BE}$ of transistor T1, and hence in the reference voltage $V_{REF}$. The present invention compensates for such variation in the $V_{BE}$ of transistor T1 by configuring a transistor T5 so that its $V_{BE}$ contributes an opposite variation to $V_{REF}$.

As discussed above, an increase in the resistor values will cause:

a decrease in currents $I_1$ and $I_2$;

an increase in current $I_{T1}$ (and a resultant increase in the $V_{BE}$ of transistor T1); and a reduction in the voltage across resistor $R_3$.

Note that resistor $R_5$ is connected directly across the base-emitter junction of transistor T1. The current $I_5$ through transistor T5 may therefore be written as $$I_5 = \frac{V_{BE1}}{R_5},$$

From this equation it may be seen that the current $I_5$ across transistor T5 will decrease as the resistor values increase. Accordingly, the $V_{BE}$ drop of transistor T5 will decrease with $I_{T1}$, in the familiar logarithmic relationship.

Figure 3:
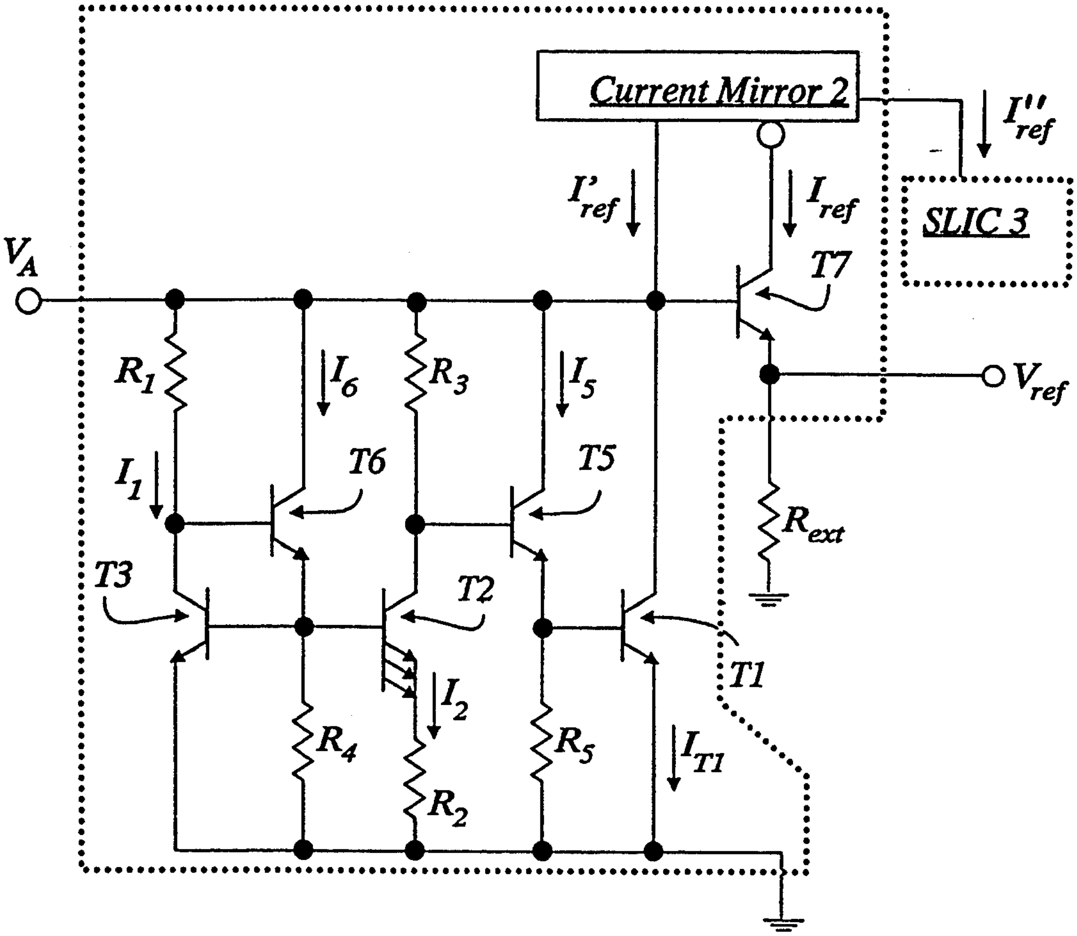
FIG. 3 schematically shows the presently preferred embodiment.

Note that the voltage at the collector of transistor T1 is not the same in FIG. 3 as in FIG. 2, since the $V_{BE}$ of transistor T5 has now been inserted between $R_3$ and the base of T1. The voltage $V_A$ at the collector of transistor T1 (in FIG. 3) can accordingly be written as $$V_A = V_{REF} + V_{BE5} = V_{BE1} + V_{BE5} + (V_{BE3} - V_{BE2})\frac{R_3}{R_2}.$$

If the increase in $V_{BE1}$ (with increasing R values) equals the decrease in $V_{BE5}$ and $R_3$, $V_A$ will remain constant regardless of variation in the values of the internal resistors. Those of ordinary skill in the art of analog design will readily select component values and device dimensions to achieve this end.

For example, in the presently preferred embodiment, all of the transistors except T2 have a minimal active area of about 8×8 microns, while transistor T2 has an active area about 10 times as great. Resistors $R_1$ and $R_3$ each have a value of about 12KΩ, resistor $R_2$ has a value of about 1.2KΩ, and resistors $R_4$ and $R_5$ each have a value of about 60KΩ. In this sample embodiment, the external precision resistor $R_{ext}$ has a value of about 25KΩ, but this value would be changed if a different supply current were needed for a different application.

FIG. 3 schematically shows the presently preferred embodiment. Reference numeral 1 generally indicates the integrated circuit of the present invention, which provides a reference voltage $V_{REF}$ which is stable over time. This reference voltage $V_{REF}$ is used to obtain a current $I_{ref}$ particularly intended for supply to telecommunications integrated circuits 3, e.g. telephony circuits of the type known in the art as SLICs (Subscriber Line Interface Circuits).

The circuit 1 comprises a first bipolar transistor T1 which is connected between a positive voltage node $V_A$ and ground. Specifically, the emitter of transistor T1 is connected to ground, while its collector is connected both to the node $V_A$ and the base of a transistor T7 whose emitter forms an output terminal or pin for the circuit 1. In operation of the circuit, the stable voltage value $V_{REF}$ would be present on that terminal.

Connected between the emitter of T7 and ground is an external resistor $R_{ext}$ whose value is set with great accuracy. The voltage drop across this resistor will be, therefore, equal to the stable voltage $V_{REF}$, which causes a current $I_{ref}$ to appear on the collector of transistor T7.

The collector of transistor T7 is connected to provide a current input to a current-mirror circuit 2. The current-mirror circuit 2 provides multiple output currents $I_{ref}$ and $I_{ref}''$ on its tap points; each of these output currents is exactly equal to (or exactly proportional to) the current $I_{ref}$, in accordance with the familiar principles of operation of current-mirror circuits. One of the output currents $I_{ref}$ is connected directly to collector of transistor T1. Other outputs are connected to supply one or more reference currents $I_{ref}''$ to one or more telecommunications devices 3.

The base of transistor T1 is connected, on the one side, to ground through a resistor $R_5$, and on the other side, to the emitter of a bipolar transistor T5 having its collector connected to the node $V_A$.

The base of this transistor T5 is connected to the node $V_A$ through a resistor $R_3$, and to the collector of a transistor T2, having a suitable area and an emitter grounded through a resistor $R_2$, which is related to the values of currents $I_1$ and $I_2$ as follows:

$$I_1 = I_2 = (V_{be3} - V_{be2})/R_2.$$

This transistor T2 has its base connected to the emitter of a transistor T6 and to ground through a resistor $R_4$. The base of T2 is also in common with the base of a transistor T3 (which has a grounded emitter).

The collector of transistor T6 is connected to the node $V_A$, while the base of T6 and the collector of transistor T3 are connected together and to the node $V_A$ through a resistor $R_1$.

It may be appreciated from the foregoing description that the circuit portion including the resistors $R_1$ and $R_4$, and the transistors T6 and T2, corresponds structurally to the portion including the resistors $R_3$ and $R_5$, and the transistors T5 and T1.

The operation of the inventive circuit will now be described.

Consider the effect of variation in the values of resistors $R_1$ and $R_2$ (for example, due to temperature dependence). If the values of these resistors increase, currents $I_1$ and $I_2$, flowing through resistors $R_1$ and $R_2$ respectively, will decrease. By contrast, the current $I_{T1}$ through transistor T1 will increase, because it is derived from the reference current $I_{ref}$ minus the values of $I_1$ and $I_2$ (and $I_5$ and $I_6$). As a result, the base-to-emitter voltage drop $V_{be1}$ of transistor T1 increases.

Moreover, since current $I_5$ on resistor $R_5$ is given by the expression: $I_5 = V_{be1}/R_5$, then it may be seen from the foregoing that this current too decreases, causing the base-to-emitter voltage $V_{be5}$ of transistor T5 to decrease.

By summing voltages, the voltage on node $V_A$ can be written as:

$$V_A = V_{be1} + V_{be5} + \Delta V_{R3}.$$

Since the current through $R_3$ will closely approximate $I_2$, this can be rewritten as $$V_A = V_{be1} + V_{be5} + I_2 R_3.$$

The voltage on $R_2$ is simply the difference between the base-emitter voltages of transistors T2 and T3, so $$V_A = V_{be1} + V_{be5} + (V_{be3} - V_{be2}) * R_3/R_2.$$

In the term $(V_{be3} - V_{be2})*R_3/R_2$, the resistor values appear only as a ratio. The difference between the base-emitter voltages of transistors T2 and T3 will be affected by temperature and the area ratios of these transistors, but is reasonably independent of the resistor values.

Thus, by making the positive increment of the base-to-emitter voltage drop $V_{be1}$ across transistor T1 equal to the decrement of the base-to-emitter voltage drop $V_{be5}$ across the other transistor T5, the value of the voltage $V_A$ will remain constant as the internal resistances of the circuit 1 vary. Accordingly, by suitably selecting the circuit, the voltage $V_A$ value can be made stable against variations in such internal resistances.

Consequently, the provision of resistors $R_4$ and $R_5$ in the circuit of this invention has a major advantage in that it avoids dependance of the currents $I_4$ and $I_5$ of the corresponding transistors T6 and T5 on their current gain $h_{FE}$.

Thus, the circuit of this invention also has the advantage of solving the technical requirements using a less complicated circuit arrangement.

FURTHER MODIFICATIONS AND VARIATIONS

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

For example, in a mixed process (which provides both bipolar and MOS devices), it would be possible to replace some circuit elements with MOS devices. Because of the importance of base-emitter drops (as shown in the foregoing discussion), transistors T1 and T5, and especially transistors T2 and T3, are preferably bipolar devices; but other transistors could be replaced with MOS circuits. For example, the current mirror circuit 2 can readily be implemented in MOS technology.

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. A circuit, comprising:
- a current source, connected to pull up a reference node;
- a first bipolar transistor, connected to pull down said reference node;
- second and third bipolar transistors, each connected to be operated at a substantially constant respective current, said second and third transistors having different respective emitter current densities;
- a first resistor, connected with said second and third transistors in such relation that the voltage drop across said resistor corresponds to the difference between the respective base-emitter voltages of said second and third transistors;
- a fourth bipolar transistor, having a base which is operatively connected to be driven by a sum of said voltage drop across said first resistor with at least one forward-biased-junction-voltage, and having an emitter which is operatively connected to drive the base of said first transistor;
- a second resistor, connected between said emitter of said fourth transistor and ground, and
- an additional resistor, connected between a base terminal of said third transistor and ground.

2. The circuit of claim 1, wherein said first and fourth transistors have equal active areas.

3. The circuit of claim 1, wherein said second transistor has more than five times as much active area as said third transistor.

4. The circuit of claim 1, wherein said second transistor has approximately ten times as much active area as said third transistor.

5. The circuit of claim 1, wherein the emitter of said first transistor is directly connected to ground, without any intervening resistor or active device.

6. The circuit of claim 1, wherein the emitter of said first transistor is directly connected to ground without any intervening resistor or active device, and the collector of said first transistor is directly connected to said reference node without any intervening resistor or active device.

7. The circuit of claim 1, wherein the collector of said first transistor is directly connected to said reference node, without any intervening resistor or active device.

8. The circuit of claim 1, wherein the collector of said first transistor is directly connected to said reference node, without any intervening resisfor or active device.

9. The circuit of claim 1, further comprising a current mirror circuit which is connected to provide said current source; and further comprising an additional transistor which is connected to be driven by said reference node, and which is connected to source current to an external precision resistor, and which is connected to sink current from an input to said current mirror.

10. The circuit of claim 1, wherein each said bipolar transistor is an NPN transistor.

11. A circuit, comprising:
- a current source, connected to pull up a reference node;
- a first bipolar transistor, connected to pull down said reference node;
- second and third bipolar transistors, said second transistor having an active area which is at least about three times as large as the active area of said third transistor, and a first resistor interposed between the emitter of said second transistor and the emitter of said third transistor; said second and third transistors having respective base terminals operatively connected together;
- a fourth bipolar transistor, having a base which is operatively connected to be driven by the collector of said second transistor, and having an emitter which is operatively connected to drive the base of said first transistor;
- a second resistor, connected between said emitter of said fourth transistor and ground;
- a third resistor connected between said emitter of said third transistor and said reference node, and a fourth resistor connected between said emitter of said second transistor and said reference node.

12. The circuit of claim 11, wherein said first and fourth transistors have equal active areas.

13. The circuit of claim 11, wherein said second transistor has more than five times as much active area as said third transistor.

14. The circuit of claim 11, wherein said second transistor has approximately ten times as much active area as said third transistor.

15. The circuit of claim 11, wherein the emitter of said first transistor is directly connected to ground, without any intervening resistor or active device.

16. The circuit of claim 11, wherein the emitter of said first transistor is directly connected to ground without any intervening resistor or active device, and the collector of said first transistor is directly connected to said reference node without any intervening resistor or active device.

17. The circuit of claim 11, wherein the collector of said first transistor is directly connected to said reference node, without any intervening resistor or active device.

18. The circuit of claim 11, wherein the collector of said first transistor is directly connected to said reference node, without any intervening resistor or active device.

19. The circuit of claim 11, further comprising a current mirror circuit which is connected to provide said current source, and further comprising an additional transistor which is connected to be driven by said reference node, and which is connected to source current to an external precision resistor, and which is connected to sink current from an input to said current mirror.

20. The circuit of claim 11, wherein each said bipolar transistor is an NPN transistor.

21. A circuit, comprising:

a current source, connected to pull up a reference node;

a first bipolar transistor, connected to pull down said reference node;

second and third bipolar transistors, said second transistor having an active area which is at least about three times as large as the active area of said third transistor, and a first resistor interposed between the emitter of said second transistor and the emitter of said third transistor;

a fourth bipolar transistor, having a base which is operatively connected to be driven by the collector of said second transistor, and having an emitter which is operatively connected to drive the base of said first transistor;

a second resistor, connected between said emitter of said fourth transistor and ground;

a third resistor connected between said emitter of said third transistor and said reference node, and a fourth resistor connected between said emitter of said second transistor and said reference node;

said second and third bipolar transistors having respective base terminals both operatively connected to be pulled up by a fifth transistor and to be pulled down by a fifth resistor which is substantially equal in value to said second resistor.

22. The circuit of claim 21, wherein said first and fourth transistors have equal active areas.

23. The circuit of claim 21, wherein said second transistor has more than five times as much active area as said third transistor.

24. The circuit of claim 21, wherein said second transistor has approximately ten times as much active area as said third transistor.

25. The circuit of claim 21, wherein the emitter of said first transistor is directly connected to ground, without any intervening resistor or active device.

26. The circuit of claim 21, wherein the emitter of said first transistor is directly connected to ground without any intervening resistor or active device, and the collector of said first transistor is directly connected to said reference node without any intervening resistor or active device.

27. The circuit of claim 21, wherein the collector of said first transistor is directly connected to said reference node, without any intervening resistor or active device.

28. The circuit of claim 21, wherein the collector of said first transistor is directly connected to said reference node, without any intervening resistor or active device.

29. The circuit of claim 21, further comprising a current mirror circuit which is connected to provide said current source; and further comprising an additional transistor which is connected to be driven by said reference node, and which is connected to source current to an external precision resistor, and which is connected to sink current from an input to said current mirror.

30. The circuit of claim 21, wherein each said bipolar transistor is an NPN transistor.

31. An integrated circuit, comprising:

a current source, connected to source current to a reference node;

first, second, third, and fourth NPN transistors, all operatively connected to sink current from said reference node to a ground node;

said second and third transistors being connected to operate at significantly different current densities;

said first through fourth transistors being connected in such relation that the potential of said reference node is equal to the base-emitter voltage of said first transistor plus the base-emitter voltage of said first transistor plus the base-emitter voltage of said fourth transistor plus a voltage which is proportional to the difference between the base-emitter voltages of said respective second and third transistors;

wherein the emitter of said first transistor is directly connected to ground without any interventing resistor or active device, and the collector of said first transistor is directly connected to said reference node without any intervening resistor or active device;

and further comprising a resistor, connected in parallel with the base-emitter junction of said first transistor.

32. The integrated circuit of claim 31, wherein said first and fourth transistors have equal active areas.

33. The integrated circuit of claim 31, wherein said second transistor has approximately ten times as much active area as said third transistor.

34. The integrated circuit of claim 31, wherein the emitter of said first transistor is directly connected to ground without any intervening resistor or active device, and the collector of said first transistor is directly connected to said reference node without any intervening resistor or active device.

35. An integrated circuit, comprising:

a first transistor having collector and emitter terminals connected between a voltage node and ground, a second transistor having a base terminal and a collector terminal thereof connected together, and an the emitter connected to provide an output, a resistor connected between said emitter and base of said first transistor, said base being also connected to the emitter of a third transistor having a collector thereof connected to said voltage node and a base thereof connected to said voltage node through a second resistor and to the collector of a fourth transistor, a further resistor between ground and the base of the fourth transistor whose emitter is grounded through a resistor fifth and sixth transistors connected together, with the base of the fifth transistor being connected to the emitter of the sixth and the base of said sixth transistor connected to the collector of the fifth transistor and connected in the circuit with the emitter of the fifth transistor connected to ground, the emitter of the sixth transistor being connected to the base of the fourth transistor, and the collector of said fourth transistor being connected to said voltage node, and the collector of said sixth transistor being connected to said voltage node through a resistor.

36. The integrated circuit of claim 35, wherein said collector of said second transistor is connected to an input of a current-mirror circuit effective to reproduce on plural outputs current values which are identical with or proportional to the one present on said collector.

37. The integrated circuit of claim 35, wherein the subcircuit defined by said first and third transistors with associated resistors corresponds structurally to the subcircuit which includes the fourth and sixth transistors and associated resistors.

* * * * *